(12) United States Patent
Roth et al.

(10) Patent No.: US 12,181,644 B2
(45) Date of Patent: Dec. 31, 2024

(54) WIDE-ANGLE PHOTOGRAPHIC OBJECTIVE

(71) Applicant: Leica Camera AG, Wetzlar (DE)

(72) Inventors: Stefan Roth, Lahnau (DE); Kathrin Keller, Lahnau (DE)

(73) Assignee: Leica Camera AG, Wetzlar (DE)

( * ) Notice: Subject to any disclaimer, the term of this patent is extended or adjusted under 35 U.S.C. 154(b) by 868 days.

(21) Appl. No.: 17/414,892

(22) PCT Filed: Dec. 17, 2019

(86) PCT No.: PCT/EP2019/085673
§ 371 (c)(1),
(2) Date: Jun. 16, 2021

(87) PCT Pub. No.: WO2020/127280
PCT Pub. Date: Jun. 25, 2020

(65) Prior Publication Data
US 2022/0066176 A1    Mar. 3, 2022

(30) Foreign Application Priority Data

Dec. 17, 2018  (DE) ..................... 10 2018 132 472.3

(51) Int. Cl.
*G02B 9/12*  (2006.01)
*G02B 3/00*  (2006.01)
(Continued)

(52) U.S. Cl.
CPC ............... *G02B 13/06* (2013.01); *G02B 9/12* (2013.01)

(58) Field of Classification Search
CPC .... G02B 25/00; G02B 3/0087; G02B 13/009; G02B 3/00; G02B 5/08; G02B 13/02; G02B 9/12
(Continued)

(56) References Cited

U.S. PATENT DOCUMENTS 5,835,286 A   11/1998  Yamanashi
9,703,072 B2   7/2017  Martin
(Continued)

FOREIGN PATENT DOCUMENTS

CN   104035194 A    9/2014
DE    2 160 628 A   12/1973
(Continued)

OTHER PUBLICATIONS

International Search Report (ISR) mailed Apr. 3, 2020 in related International Application No. PCT/EP2019/085673 (four pages).
(Continued)

*Primary Examiner* — Dawayne Pinkney
(74) *Attorney, Agent, or Firm* — Kilpatrick Townsend & Stockton LLP

(57) ABSTRACT

A wide-angle objective in accordance with the invention comprises, in an order from an object-side end to an image-side end, a front group of total positive refractive power having at least four lenses; a middle group of total positive refractive power having at least three lenses; and a rear group of total positive refractive power having at least three lenses, wherein the quotient of the focal length of the front group and the total focal length of the objective amounts to between 2.28 and 2.79, the quotient of the focal length of the middle group and the total focal length of the objective amounts to between 3.02 and 3.69, and the quotient of the focal length of the rear group and the total focal length of the objective amounts to between 3.50 and 4.29.

28 Claims, 3 Drawing Sheets

Figure 1:
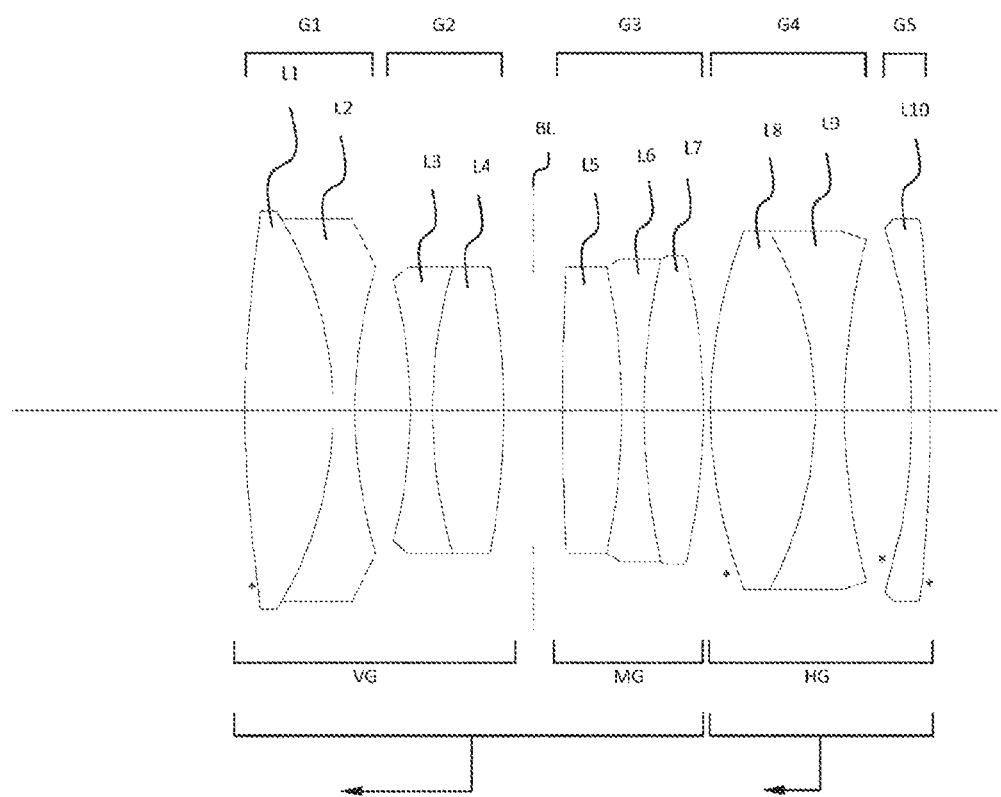

(51) Int. Cl.
*G02B 5/08* (2006.01)
*G02B 13/02* (2006.01)
*G02B 13/06* (2006.01)
*G02B 25/00* (2006.01)

(58) Field of Classification Search
USPC ....... 359/792, 784, 645, 661, 689, 716, 735, 359/748
See application file for complete search history.

(56) References Cited

U.S. PATENT DOCUMENTS

| | | |
|---|---|---|
| 2005/0185301 A1 | 8/2005 | Karbe |
| 2008/0130141 A1 | 6/2008 | Ishibashi |
| 2012/0026609 A1 | 2/2012 | Kubota |
| 2015/0277087 A1 | 10/2015 | Karbe et al. |
| 2016/0070086 A1 | 3/2016 | Martin |
| 2019/0101727 A1* | 4/2019 | Yuki ................. G02B 13/16 |
| 2019/0101732 A1* | 4/2019 | Yuki ................. G02B 13/18 |
| 2019/0361205 A1* | 11/2019 | Wolterink .......... G02B 13/0085 |
| 2020/0249430 A1* | 8/2020 | Kawamura .......... G02B 13/02 |

FOREIGN PATENT DOCUMENTS

| | | |
|---|---|---|
| DE | 10 2004 008 997 A1 | 10/2005 |
| DE | 10 2014 104 457 B3 | 2/2015 |
| DE | 10 2014 112 853 B4 | 6/2016 |
| EP | 2 194 412 A1 | 6/2010 |
| EP | 2 993 512 A1 | 3/2016 |
| JP | 61-231517 A | 10/1986 |
| JP | S63-247713 A | 10/1988 |
| JP | H02-081015 A | 3/1990 |
| JP | 2004-334185 A | 11/2004 |
| JP | 2012-185263 A | 9/2012 |
| JP | 2013-25174 A | 2/2013 |

OTHER PUBLICATIONS

Chinese Office Action dated Sep. 22, 2022 in related Chinese Application No. 201980086922.X (nine pages).
Japanese Office Action dated Feb. 14, 2023 in related Japanese Application No. 2021-534685 (five pages).
Partial English Translation of German Search Report dated Jul. 24, 2019 in related German Patent Application No. 10 2018 132 472.3 (six pages).

* cited by examiner

WIDE-ANGLE PHOTOGRAPHIC OBJECTIVE

This application is a U.S. National Phase Application of PCT/EP2019/085673, filed Dec. 17, 2019, which claims the priority of German Patent Application 10 2018 132 472.3, filed Dec. 17, 2018, the entireties of which are incorporated by reference herein.

The present invention relates to a wide-angle objective for photographic applications.

Wide-angle objectives of the retrofocus type, comprising a front group having a negative refractive power and a rear group having a positive refractive power, are generally known.

Symmetrical objective designs are furthermore known that comprise a middle group having a positive refractive power, and a front group and a rear group that each have a negative refractive power. Such designs are in particular suitable for mirrorless cameras.

Quasi-symmetrical designs, in which a front group, a middle group and a rear group that each have a positive refractive power are provided, are likewise known for the use at mirrorless cameras.

Wide-angle objectives of the compact modified retrofocus type having a constant overall length during the focusing are also known for a use at mirrorless cameras. Such an objective is described in DE 10 2014 104 457 B3, for example. However, the nine-lens objective disclosed there has a large overall length due to the internal focusing provided there.

An eight-lens wide-angle objective having two aspherical surfaces is described in DE 2 160 628 A.

A microscope objective comprising three lens groups is known from EP 2 194 412 A1, wherein the rear group has a negative refractive power and a diffractive optical element is additionally provided between the middle group and the rear group.

A seven-lens photographic objective of the modified double Gaussian type is disclosed in DE 10 2004 008 997 A1.

EP 2 993 512 A1 describes a wide-angle objective comprising ten lenses, wherein a diaphragm is arranged centrally between the fifth lens and the sixth lens. Lenses of a positive refractive power and lenses of a negative refractive power are alternately arranged before and after the diaphragm in the light direction, with the lenses disposed before the diaphragm in the light direction having a total negative refractive power.

Very compact dimensions are only achieved by objectives that have a symmetrical or quasi-symmetrical design. In retrofocus designs, compact dimensions are not possible due to their principle. Furthermore, the correction of coma, distortion, and lateral chromatic aberration is only incomplete due to the asymmetrical design.

In general, high refractive powers are required in the individual elements in the design of compact wide-angle objectives. However, this leads to third-order and higher-order aberrations that result in uncorrected residual errors in the image, which has an unfavorable effect on the image contrast.

In compact objectives, the correction of the image field curvature, of the astigmatism, of the distortion, and of the chromatic aberration is often only possible with restrictions.

It is the object of the present invention to provide a wide-angle photographic objective that has compact dimensions and a particularly good correction of all the image errors.

The object is satisfied by a wide-angle photographic objective having the features of claim 1. The wide-angle objective in accordance with the invention comprises, in an order from an object-side end to an image-side end, a front group of total positive refractive power having at least four lenses; a middle group of total positive refractive power having at least three lenses; and a rear group of total positive refractive power having at least three lenses, wherein the quotient of the focal length of the front group and the total focal length of the objective amounts to between 2.28 and 2.79, the quotient of the focal length of the middle group and the total focal length of the objective amounts to between 3.02 and 3.69, and the quotient of the focal length of the rear group and the total focal length of the objective amounts to between 3.50 and 4.29. The wide-angle objective in accordance with the invention therefore has a total of at least ten lenses.

Compared to objective designs of the retrofocus type, the wide-angle objective in accordance with the invention has very compact dimensions, in particular with respect to the overall length, and is thus in particular suitable for the use with digital mirrorless system cameras.

In accordance with an advantageous embodiment, the front group, the middle group, and the rear group each comprise at least one lens having a negative refractive power and at least one lens having a positive refractive power.

A majority of the lenses having a negative refractive power advantageously have a refractive index of less than or equal to 1.70, an Abbe number of between 38 and 45, and/or a deviation of the relative partial dispersion $\Delta P_{g,F}$ from the normal line of less than or equal to $-0.0035$. Glasses having a relatively low refractive index, a relatively low Abbe number, and a negative deviation of the relative partial dispersion from the normal line are thus preferably used for the lenses having a negative refractive power. The relative partial dispersion $P_{g,F}$ is defined by:

$$P_{g,F} = \frac{n_g - n_F}{n_F - n_C},$$

where $n_F$ is the refractive index at the Fraunhofer line F (wavelength 468.13 nm), $n_g$ is the refractive index at the Fraunhofer line g (wavelength 435.83 nm), and no is the refractive index at the Fraunhofer line C (wavelength 656.28 nm).

The deviation of the relative partial dispersion $\Delta P_{g,F}$ from the normal line is defined by:

$$\Delta P_{g,F} = P_{g,F} - (0.6438 - 0.001682 \cdot v_d),$$

where $v_d$ is the Abbe number at the Fraunhofer line d (wavelength 587.56 nm).

The majority of the lenses having a negative refractive power advantageously comprise all the lenses having a negative refractive power with the exception of a lens having a negative refractive power arranged at the image-side end of the rear group.

Due to the use of glasses having one or more of the mentioned properties, chromatic aberrations in the primary and secondary spectrum can be corrected. The last lens of the rear group can be exempted from one or more of these conditions in favor of an aspherical design by precision glass molding.

In accordance with a further advantageous embodiment, the rear group is formed as a floating element that is preferably shifted in the same direction as the front group and the middle group on the focusing, with the shifting distance of the rear group, however, being smaller than the shifting distance of the front group and of the middle group. The latter condition thus means that the adjustment path of the rear group is smaller on the focusing than the adjustment path of the total objective. A particularly good imaging performance at close range can hereby be achieved since the image errors coma and astigmatic difference can be compensated.

In accordance with a further advantageous embodiment, the front group comprises, in an order from an object-side end to an image-side end, at least a first lens having a positive refractive power, a second lens having a negative refractive power, a third lens having a negative refractive power, and a fourth lens having a positive refractive power, with preferably the lenses having a positive refractive power being bi-convex and the lenses having a negative refractive power being bi-concave.

The lenses of the front group advantageously have an Abbe number of between 38 and 45, with preferably the lenses of the front group, which have a negative refractive power, having a deviation of the relative partial dispersion $\Delta P_{g,F}$ from the normal line of less than or equal to −0.0035. The deviation of the relative partial dispersion $\Delta P_{g,F}$ from the normal line is thus negative. Unwanted contributions to the chromatic aberration of the secondary spectrum can be minimized by this embodiment.

The first lens advantageously has a refractive index of between 1.80 and 1.86 and/or the fourth lens has a refractive index of greater than or equal to 1.86.

The first lens and the second lens advantageously form a first subgroup that is formed as a cemented doublet and/or that has a total refractive power that amounts to no more than 10%, preferably no more than 7.5%, of the total refractive power of the front group. The quotient of the focal length of the first subgroup and the total focal length of the objective in particular amounts to between 43.49 and 53.13. The third lens and the fourth lens preferably form a second subgroup that is formed as a cemented doublet.

The different lens surfaces of the front group advantageously have respective radii of curvature, where rn describes the radius of a surface n at the vertex. There is described:
  r1 describes the curvature of the object-side surface of the first lens L1;
  r2 describes the curvature of the contact surface between the first lens L1 and the second lens L2;
  r3 describes the curvature of the image-side surface of the second lens L2;
  r4 describes the curvature of the object-side surface of the third lens L3;
  r5 describes the curvature of the contact surface between the third lens L3 and the fourth lens L4; and
  r6 describes the curvature of the image-side surface of the fourth lens L4.

For a respective ratio of two radii $r_n/r_m$, one or more of the following relationships preferably apply:

$$1.58 < r1/r6 < -1.29,$$

$$-1.07 < r2/r5 < -0.88,$$

$$-1.04 < r3/r4 < -0.85.$$

The above mentioned features of the lenses of the front group contribute towards correcting the astigmatic difference, minimizing the Petzval sum, which is a measure for the image field curvature of the objective, and reducing the chromatic aberration.

The front group, preferably the first lens, advantageously has at least one aspherical surface, with in particular at least the object-side surface of the first lens being aspherical. Unwanted contributions to the distortion can be minimized by these features and by the features of the first subgroup described above. In addition, the first subgroup is suitable as an adjustment member or a sliding member to minimize centering errors at the image center on the assembly of the objective.

In general, the above mentioned advantageous designs of the lenses of the front group contribute towards minimizing the lateral chromatic aberration and the distortion, and flattening the image field.

In accordance with a further advantageous embodiment of the invention, the middle group comprises, in an order from an object-side end to an image-side end, at least a fifth lens having a positive refractive power, a sixth lens having a negative refractive power, and a seventh lens having a positive refractive power that are preferably combined to form a cemented triplet, with preferably the lenses having a positive refractive power being bi-convex and the lenses having a negative refractive power being bi-concave, and with preferably the refractive indices of the lenses having a positive refractive power being smaller than the refractive indices of the lenses having a negative refractive power.

The different lens surfaces of the middle group advantageously have respective radii of curvature, where rn describes the radius of a surface n at the vertex. There is described:
  r8 describes the curvature of the object-side surface of the fifth lens L5,
  r9 describes the curvature of the contact surface between the fifth lens L5 and the sixth lens L6,
  r10 describes the curvature of the contact surface between the sixth lens L6 and the seventh lens L7, and
  r11 describes the curvature of the image-side surface of the seventh lens L7.

For a respective ratio of two radii $r_n/r_m$, one or more of the following relationships preferably apply:

$$-7.11 < r8/r11 < -5.82,$$

$$-1.51 < r9/r10 < -1.24.$$

This design contributes to a correction of the astigmatism with a simultaneous minimization of the spherical aberration in the sagittal section. Furthermore, a middle group designed in this way is suitable as an adjustment member or a sliding member to minimize centering errors in the image field on the assembly.

The lenses of the middle group having a positive refractive power advantageously have an Abbe number of greater than or equal to 65 and/or a deviation of the relative partial dispersion $\Delta P_{g,F}$ from the normal line of greater than or equal to +0.0130.

The lenses of the middle group having a negative refractive power advantageously have an Abbe number of between 38 and 45 and/or a deviation of the relative partial dispersion $\Delta P_{g,F}$ from the normal line of less than or equal to −0.0035.

The above mentioned features of the lenses of the middle group contribute towards correcting the chromatic aberrations of the primary and secondary spectrum at the image center.

In accordance with a further advantageous embodiment of the invention, the rear group comprises, in an order from an object-side end to an image-side end, at least an eighth lens having a positive refractive power, a ninth lens having a negative refractive power, and a tenth lens having a negative refractive power, with preferably the eighth and ninth lenses being combined to form a cemented doublet, and/or with preferably the eighth lens being bi-convex and/or the ninth lens being bi-concave, and/or the tenth lens being meniscus-shaped, with preferably the surfaces being arranged hollow toward the object side.

The eighth lens advantageously has an Abbe number of between 38 and 45 and/or a refractive index of between 1.80 and 1.86.

The ninth lens advantageously has an Abbe number of between 38 and 45 and/or a deviation of the relative partial dispersion $\Delta P_{g,F}$ from the normal line of less than or equal to −0.0035.

The above mentioned features related to the lenses of the rear group contribute towards minimizing the Petzval sum and unwanted contributions to the chromatic aberration of the primary and secondary spectrum.

The object-side surface of the eighth lens and/or both surfaces of the tenth lens are advantageously aspherical. The aspherical design of said surfaces contributes towards balancing the astigmatic difference and coma over the image field, as well as minimizing unwanted contributions to the spherical aberration.

The different lens surfaces of the rear group advantageously have respective radii of curvature, where rn describes the radius of a surface n at the vertex. There is described:

r12 describes the curvature of the object-side surface of the eighth lens L8;

r13 describes the curvature of the contact surface between the eighth lens L8 and the ninth lens L9;

r14 describes the curvature of the image-side surface of the ninth lens L9;

r15 describes the curvature of the object-side surface of the tenth lens L10; and r16 describes the curvature of the image-side surface of the tenth lens L10.

With $s_n$ as the paraxial object distance at the surface n, a magnitude $\Delta r_n$ is defined by $(s_n-r_n)/r_n$.

For a respective relationship between two radii $r_n/r_m$ or the magnitude $\Delta r_n$, one or more of the following relationships preferably apply:

$+0.5 < \Delta r12 < +0.9$, $-2.5 < \Delta r13 < -2.1$, $-0.2 < \Delta r14 < +0.2$, $-1.3 < \Delta r15 < +1.0$, $-1.3 < \Delta r16 < +1.0$, $r16 < r15$.

Furthermore, the above mentioned advantageous embodiments of the lenses of the rear group contribute towards making the individual elements insensitive, but with an opposite effect, with respect to a decentration on the assembly so that, as a result, the total rear group likewise becomes insensitive with respect to a decentration.

In accordance with a further advantageous embodiment, the quotient of the diameter of the lens and the center thickness is greater than or equal to 18 for a majority of the lenses having a negative refractive power.

The majority of the lenses having a negative refractive power advantageously comprise all the lenses having a negative refractive power with the exception of the third lens. The third lens may be exempted from the above condition in order to achieve a better balance between coma and astigmatism.

The quotient of the center thickness and the edge thickness is advantageously greater than or equal to 5.8 for each biconvex lens having at least one aspherical surface.

The above mentioned measurements of the quotients of the lens diameter and the center thickness or of the center thickness and the edge thickness contribute to a compact design of the total objective so that the ratio between the optical overall length SO' and half the image diagonal YB is less than or equal to 3.1 and the ratio between the optical overall length SO' and the total focal length $f'_{ges}$ of the objective is less than or equal to 1.9.

In accordance with a further advantageous embodiment, the front group comprises a first subgroup having a positive refractive power and a second subgroup having a positive refractive power, the middle group comprises a third subgroup having a positive refractive power, and the rear group comprises a fourth subgroup having a positive refractive power and a fifth subgroup having a negative refractive power, with each subgroup in each case being formed from a plurality of lenses combined to form a cemented compound lens or from a single lens.

In accordance with a further advantageous embodiment, an aperture diaphragm is arranged between the front group and the middle group.

In accordance with a further advantageous embodiment, the relative aperture amounts to 1:2.0. The angle of view amounts to approximately 62.2°.

The first lens advantageously has a Knoop hardness HK of at least 600 N/mm² and/or an acid resistance in accordance with ISO 8424 better than 4.0 (acid resistance class 4, no visible surface changes). A sufficient resistance of the front lens with respect to mechanical loads and environmental influences is thereby given. These features are, for example, satisfied by the glass material S-LAH89 from the producer Ohara.

A wide-angle objective in accordance with one or more of the above mentioned embodiments is characterized by
compact dimensions;
a very high contrast and detail reproduction over the total image field;
an imperceptible distortion;
a very good flattening of the image field on a simultaneously very good correction of the chromatic aberration and lateral chromatic aberration over the primary and secondary spectrum;
a uniformly good contrast reproduction and correction of the image errors up to a close-up range of 0.3 m; and
a simple assembly of the optical groups.

Further advantageous embodiments of the invention result from the dependent claims, from the description, and from the drawing, wherein individual features and/or feature groups can to be combined with one another in a suitable manner—also in a manner differing from the feature combinations explicitly mentioned here.

Figure 2:
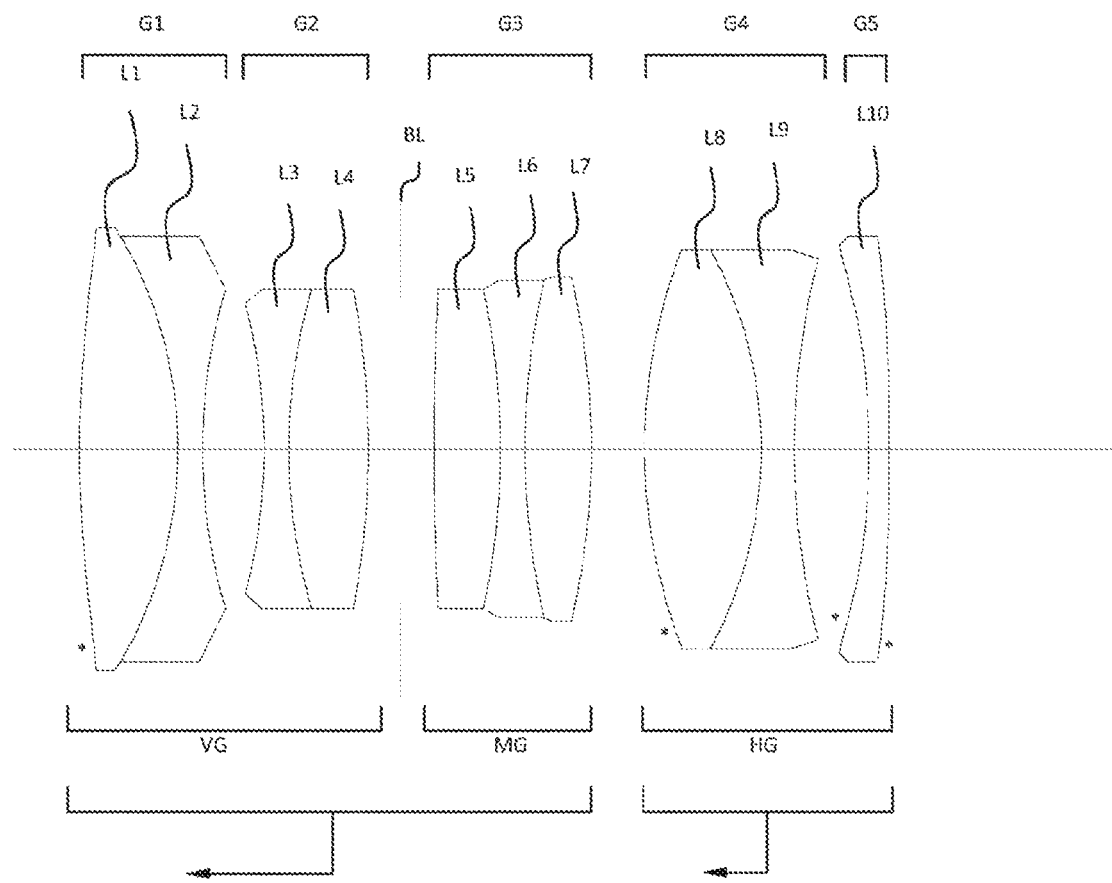
Figure 3:
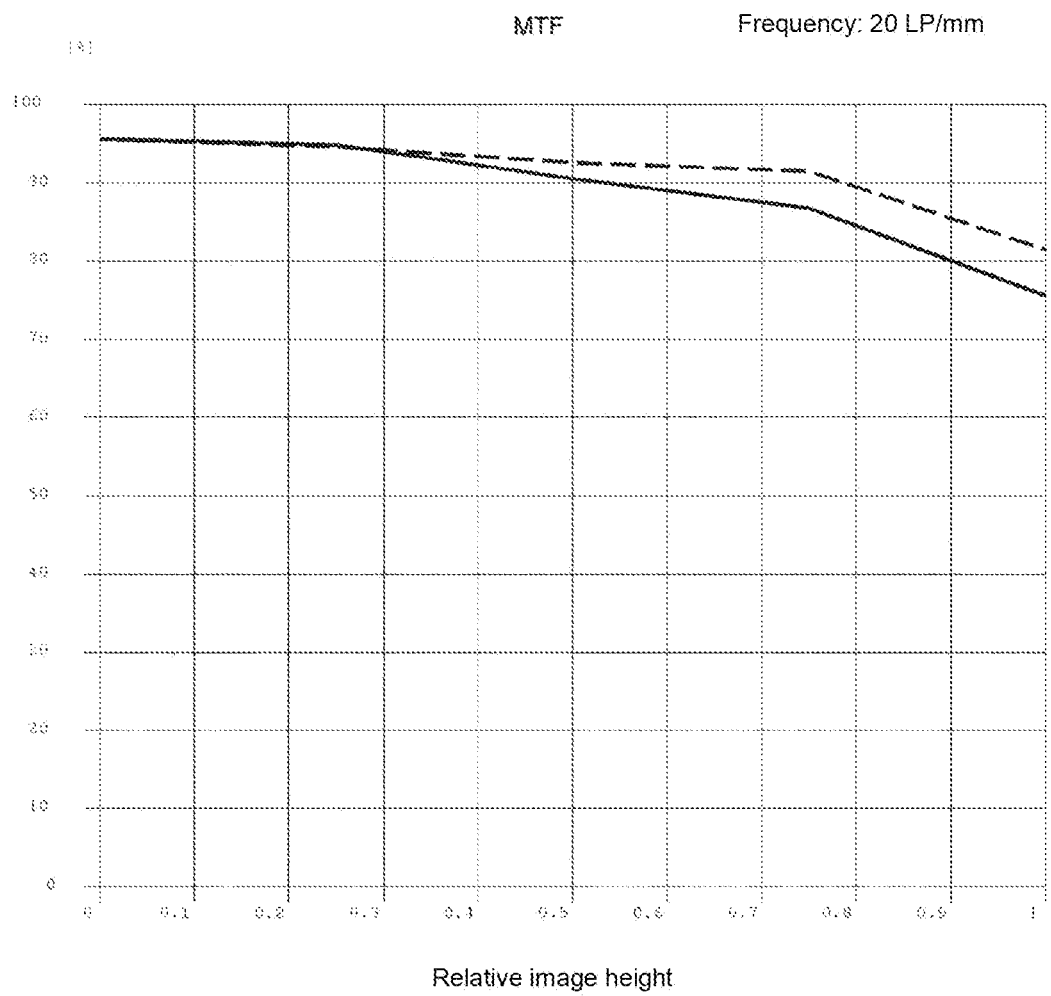

The invention will be described in the following with reference to an embodiment and to the drawings. There are shown:

FIG. 1 a lens section of a wide-angle objective in accordance with an embodiment of the invention in the infinity distance setting;

FIG. 2 a lens section of the wide-angle objective in accordance with FIG. 1 in the close distance setting; and FIG. 3 a diagram of a modulation transfer function of the wide-angle objective in accordance with FIGS. 1 and 2.

FIGS. 1 and 2 show a wide-angle photographic objective in accordance with an embodiment example having ten refractive lenses L1 to L10.

The lenses L1 to L10 are numbered in ascending order in a direction of light propagation of the optical path starting from the object side to the image side. Relative position indications such as "front of" or "behind" relate to this order.

The wide-angle objective comprises a front group VG that comprises the first to fourth lenses L1 to L4; a middle group MG that comprises the fifth to seventh lenses L5 to L7; and a rear group HG that comprises the eighth to tenth lenses.

The first lens L1 having a positive refractive power and the second lens L2 having a negative refractive power are connected to form a cemented doublet and form a first subgroup G1. The third lens L3 having a negative refractive power and the fourth lens L4 having a positive refractive power are likewise connected to form a cemented doublet and form a second subgroup G2. The front group VG thus comprises the first and second subgroups G1, G2.

The fifth lens L5 having a positive refractive power, the sixth lens L6 having a negative refractive power, and the seventh lens L7 having a positive refractive power are connected to form a cemented triplet and form a third subgroup G3. The middle group MG comprises the third subgroup G3.

The eighth lens L8 having a positive refractive power and the ninth lens L9 having a negative refractive power are connected to form a further cemented doublet and form a fourth subgroup G4. The tenth lens L10 having a negative refractive power is designed as a single lens and forms a fifth subgroup G5. The rear group HG comprises the fourth and fifth subgroups G4, G5.

An aperture diaphragm BL is arranged between the front group VG and the middle group MG.

The rear group HG is formed as a floating element and moves in the same direction as the residual objective, which is formed by the front group VG, the aperture diaphragm BL and the middle group MG, on the focusing, with the shifting distance and thus the adjustment path of the floating element or of the rear group HG, however, being smaller than the shifting distance or the adjustment path of the residual objective.

Detailed design data and optical data for the lens elements of the wide-angle objective are indicated in the following tables. The data relate to the surfaces that designate respective air-to-glass or glass-to-glass transitions and are numbered in ascending order from the object-side end to the image-side end. Thus, the surface 1 designates the object-side surface of the first lens L1, the surface 2 designates the common surface of the first and second lenses L1, L2, and so on. The last surface 16 is the image-side surface of the tenth lens L10. The surface 7 corresponds to the aperture diaphragm BL.

The design data are normalized to a total focal length of the wide-angle objective of f=1 mm.

For a respective surface, r designates the vertex radius, $d_M$ designates the center thickness or the spacing from an adjacent surface at the vertex, $n_e$ designates the refractive index for the Fraunhofer line e (wavelength 546.07 nm), and $v_e$ designates the Abbe number for the Fraunhofer line e. Furthermore, $D/d_M$ designates the ratio between the diameter D and the center thickness $d_M$, $dM/dr$ designates the ratio between the center thickness $d_M$ and the edge thickness dr, s designates the paraxial object distance, s' designates the paraxial image distance, and a designates the aplanatic object distance.

The affiliations of the respective surfaces to the respective lenses L1-L10, to the subgroups G1-G5, and to the groups HG, MG and HG are likewise shown.

| Surface | r[mm] | $d_M$ [mm] | $n_e$ | $V_e$ | $\Delta P_{gF}$ | Lens | Subgroup | Group |
|---|---|---|---|---|---|---|---|---|
| 1 | 1.546 | 0.17 | 1.855 | 40 | | L1 | G1 | VG |
| 2 | −0.628 | 0.03 | 1.658 | 39 | −0.004 | L2 | | |
| 3 | 0.742 | 0.10 | 1.000 | | | | | |
| 4 | −0.790 | 0.06 | 1.658 | 39 | −0.004 | L3 | G2 | |
| 5 | 0.648 | 0.13 | 1.888 | 41 | | L4 | | |
| 6 | −1.081 | 0.04 | 1.000 | | | | | |
| 7 | Diaphragm | 0.04 | 1.000 | | | | | |
| 8 | 5.209 | 0.19 | 1.498 | 81 | +0.031 | L5 | G3 | MG |
| 9 | −0.876 | 0.03 | 1.658 | 39 | −0.004 | L6 | | |
| 10 | 0.641 | 0.15 | 1.498 | 81 | +0.031 | L7 | | |
| 11 | −0.809 | 0.01 | 1.000 | | | | | |
| 12 | 0.802 | 0.22 | 1.855 | 40 | | L8 | G4 | HG |
| 13 | −0.616 | 0.03 | 1.658 | 39 | −0.004 | L9 | | |
| 14 | 0.653 | 0.19 | 1.000 | | | | | |
| 15 | −1.490 | 0.03 | 1.583 | 59 | | L10 | G5 | |
| 16 | −6.742 | 0.36 | 1.000 | | | | | |

| Surface | $D/d_M$ | $d_M/dr$ | (s−a)/a [mm] |
|---|---|---|---|
| 1 | | 9.1 | |
| 2 | 23.9 | | |
| 3 | | | |
| 4 | | | |
| 5 | | | |
| 6 | 12.9 | | |
| 7 | | | |
| 8 | | | |
| 9 | 18.0 | | |
| 10 | | | |
| 11 | 96.4 | | |
| 12 | | 6.2 | −0.41 |
| 13 | 23.9 | | −1.69 |
| 14 | | | −0.42 |
| 15 | 20.0 | | −1.10 |
| 16 | | | −1.06 |

The object-side surfaces of the first and eighth lenses L1, L8 (surfaces 1 and 12) and both surfaces of the tenth lens L10 (surfaces 15 and 16) have an aspherical curvature and are marked with the sign * in FIGS. 1 and 2. The following asphere equation applies to a sag z of a respective lens surface in parallel with the optical axis at a point having the height h with respect to the optical axis and perpendicular thereto:

$$z(h) = \frac{h^2/r0}{1 + \sqrt{1 - (1+k)(h/r0)^2}} + a2 \cdot h^4 + a3 \cdot h^6 + \ldots + a6 \cdot h^{12},$$

where r0 is the vertex radius of curvature, k is the conical constant, and a2, a3, ..., a6 are the aspherical coefficients.

The coefficients k, a2 to a6 are indicated in the following table (in an exponential representation) for the four aspherical surfaces 1, 12, 15, and 16:

| Surface | k | a2 | a3 | a4 | a5 | a6 |
|---|---|---|---|---|---|---|
| 1 | 0 | 0.1569D−4 | −0.182035D+1 | 0.2404D−10 | | |
| 12 | 0 | 0.1111D−5 | −0.524051D+0 | 0.4762D−10 | | |
| 15 | 0 | 0.9390D−4 | 0.357335D+2 | 0.9081D−09 | 0.169936D+2 | 0.7799D−15 |
| 16 | 0 | 0.6674D−4 | 0.366574D+2 | 0.1080D−08 | | |

Further optical data for the total objective, the subgroups G1 to G5, and the front, middle and rear groups VG, MG, HG are indicated in the table below. The table comprises the sign of the refractive power and the respective focal length f' of the subgroups and groups. Furthermore, the ratio of the respective focal lengths f' to the total focal length $f'_{ges}$ of the objective is indicated.

| Subgroup | Refractive power | f' [mm] | f'/f'ges |
|---|---|---|---|
| Objective | + | 1.00 | 1.00 |
| G1 | + | 48.07 | 48.07 |
| G2 | + | 2.47 | 2.47 |
| G3 | + | 3.34 | 3.34 |
| G4 | + | 2.04 | 2.04 |
| G5 | − | −3.29 | −3.29 |
| VG | + | 2.52 | 2.52 |
| MG | + | 3.34 | 3.34 |
| HG | + | 3.87 | 3.87 |

The lens speed or the relative aperture of the wide-angle objective amounts to 1:2.0. The total diagonal angle of view amounts to 62.2°. The ratio of the optical overall length SO' to the total focal length $f'_{ges}$ amounts to 1.85 and the ratio between the optical overall length SO' and half the image diagonal amounts to 3.08. The ratio between the image distance S'O' and the total focal length $f'_{ges}$ amounts to 0.43.

Different radius ratios for surfaces of the front group VG and of the middle group MG are indicated in the following table. A value $r_n$ in each case designates the radius of curvature at the vertex of the surface n.

| Group | | Radius ratio |
|---|---|---|
| VG | r1/r6 | −1.43 |
| | r2/r5 | −0.97 |
| | r3/r4 | −0.94 |
| MG | r8/r11 | −6.44 |
| | r9/r10 | −1.37 |

The design data and optical values of the design of a wide-angle objective in accordance with the invention that are described above are only exemplary. It is understood that wide-angle objectives having different design data and optical parameters can also be covered by the present invention.

Further lenses can in particular also be provided in addition to the ten lenses mentioned by way of example. Thus, the front group VG, the middle group MG, and/or the rear group HG can, for example, each have a further lens having a positive or a negative refractive power at a suitable location. It is understood that the numbering of the lenses may shift accordingly in the case of such a modification.

The modulation transfer function MTF for a test object comprising 20 line pairs/mm is shown in FIG. 3. In the diagram, the contrast or the modulation is entered as a percentage over the relative image height. The solid line represents the MTF for sagittal structures, while the dashed line represents the MFT for tangential structures. The wide-angle objective has been set to an object distance of infinity. It can be seen from the diagram that the contrast also does not drop below approximately 75% at the image margins.

REFERENCE NUMERAL LIST

BL aperture diaphragm
L1-L10 first to tenth lenses
G1-G5 first to fifth subgroups
VG front group
MG middle group
HG rear group

The invention claimed is:

1. A wide-angle photographic objective comprising, in sequence from an object-side end to an image-side end:
   a front group of total positive refractive power having at least four lenses;
   a middle group of total positive refractive power having at least three lenses; and
   a rear group of total positive refractive power having at least three lenses,
   wherein the quotient of the focal length of the front group and the total focal length of the objective amounts to between 2.28 and 2.79, the quotient of the focal length of the middle group and the total focal length of the objective amounts to between 3.02 and 3.69, and the quotient of the focal length of the rear group and the total focal length of the objective amounts to between 3.50 and 4.29,
   wherein the front group comprises, in sequence from an object-side end to an image-side end, at least a first lens having a positive refractive power, a second lens having a negative refractive power, a third lens having a negative refractive power, and a fourth lens having a positive refractive power.

2. The wide-angle objective in accordance with claim 1, wherein the front group, the middle group, and the rear group each comprise at least one lens having a negative refractive power and at least one lens having a positive refractive power.

3. The wide-angle objective in accordance with claim 2, wherein a majority of the lenses having a negative refractive power have a refractive index of less than or equal to 1.70, an Abbe number of between 38 and 45, and/or a deviation of the relative partial dispersion $\Delta P_{g,F}$ from the normal line of less than or equal to −0.0035.

4. The wide-angle objective in accordance with claim 3, wherein the majority of the lenses having a negative refractive power comprise all the lenses having a negative refractive power with the exception of a lens having a negative refractive power arranged at the image-side end of the rear group.

5. The wide-angle objective in accordance with claim 1, wherein the rear group is formed as a floating element.

6. The wide-angle objective in accordance with claim 5, wherein the floating element is shifted in the same direction as the front group (VG) and the middle group (MG) on the focusing, with a shifting distance of the rear group, however, being smaller than a shifting distance of the front group and of the middle group.

7. The wide-angle objective in accordance with claim 1, wherein the lenses having a positive refractive power (L1, L4) are bi-convex and the lenses having a negative refractive power (L2, L3) are bi-concave.

8. The wide-angle objective in accordance with claim 1, wherein the lenses of the front group have an Abbe number of between 38 and 45.

9. The wide-angle objective in accordance with claim 8, wherein the lenses (L2, L3) of the front group (VG), which have a negative refractive power, have a deviation of the relative partial dispersion $\Delta P_{g,F}$ from the normal line of less than or equal to $-0.0035$.

10. The wide-angle objective in accordance with claim 1, wherein the first lens has a refractive index of between 1.80 and 1.86 and/or the fourth lens has a refractive index of greater than or equal to 1.86.

11. The wide-angle objective in accordance with claim 1, wherein the first lens and the second lens form a first subgroup that is formed as a cemented doublet and/or that has a total refractive power that amounts to no more than 10%, preferably no more than 7.5%, of the total refractive power of the front group.

12. The wide-angle objective in accordance with claim 1, wherein the third lens and the fourth lens form a second subgroup that is formed as a cemented doublet.

13. The wide-angle objective in accordance with claim 5, wherein the front group, preferably the first lens, has at least one aspherical surface, with in particular at least the object-side surface of the first lens (L1) being aspherical.

14. The wide-angle objective in accordance with claim 1, wherein the middle group comprises, in sequence from an object-side end to an image-side end, at least a fifth lens having a positive refractive power, a sixth lens having a negative refractive power, and a seventh lens having a positive refractive power that are preferably combined to form a cemented triplet.

15. The wide-angle objective in accordance with claim 14, wherein the lenses having a positive refractive power (L5, L7) are bi-convex and the lenses having a negative refractive power (L6) are bi-concave.

16. A wide-angle photographic objective comprising, in sequence from an object-side end to an image-side end:
  a front group of total positive refractive power having at least four lenses;
  a middle group of total positive refractive power having at least three lenses; and
  a rear group of total positive refractive power having at least three lenses,
wherein the quotient of the focal length of the front group and the total focal length of the objective amounts to between 2.28 and 2.79, the quotient of the focal length of the middle group and the total focal length of the objective amounts to between 3.02 and 3.69, and the quotient of the focal length of the rear group and the total focal length of the objective amounts to between 3.50 and 4.29,
  wherein the middle group comprises, in sequence from an object-side end to an image-side end, at least a fifth lens having a positive refractive power, a sixth lens having a negative refractive power, and a seventh lens having a positive refractive power that are preferably combined to form a cemented triplet, and
  wherein the lenses of the middle group having a positive refractive power have an Abbe number of greater than or equal to 65 and/or a deviation of the relative partial dispersion $\Delta P_{g,F}$ from the normal line of greater than or equal to $+0.0130$.

17. The wide-angle objective in accordance with claim 14, wherein the lenses of the middle group having a negative refractive power have an Abbe number of between 38 and 45 and/or a deviation of the relative partial dispersion $\Delta P_{g,F}$ from the normal line of less than or equal to $-0.0035$.

18. The wide-angle objective in accordance with claim 1, wherein the rear group comprises, in sequence from an object-side end to an image-side end, at least an eighth lens having a positive refractive power, a ninth lens having a negative refractive power, and a tenth lens having a negative refractive power.

19. The wide-angle objective in accordance with claim 18, wherein the eighth and ninth lenses (L8, L9) are combined to form a cemented doublet, and/or wherein the eighth lens (L8) is being bi-convex and/or the ninth lens (L9) is bi-concave, and/or the tenth lens (L10) is meniscus-shaped.

20. The wide-angle objective in accordance with claim 18, wherein the eighth lens has an Abbe number of between 38 and 45 and/or a refractive index of greater than or equal to 1.80 and less than or equal to 1.86.

21. The wide-angle objective in accordance with claim 18, wherein the ninth lens has an Abbe number of between 38 and 45 and/or a deviation of the relative partial dispersion $\Delta P_{g,F}$ from the normal line of less than or equal to $-0.0035$.

22. The wide-angle objective in accordance with claim 18, wherein the object-side surface of the eighth lens and/or both surfaces of the tenth lens are aspherical.

23. The wide-angle objective in accordance with claim 1, wherein the quotient of the diameter of a lens and the center thickness is greater than or equal to 18 for a majority of the lenses having a negative refractive power.

24. The wide-angle objective in accordance with claim 23, wherein the majority of the lenses having a negative refractive power comprise all the lenses having a negative refractive power with the exception of a third lens wherein the third lens is located in the front group.

25. The wide-angle objective in accordance with claim 1, wherein an aperture diaphragm is arranged between the front group and the middle group.

26. The wide-angle objective in accordance with claim 1, wherein the angle of view amounts to 62.2° and the relative aperture amounts to 1:2.0.

27. The wide-angle objective in accordance with claim 1, wherein the quotient of the center thickness and the edge thickness is greater than or equal to 5.8 for each biconvex lens having at least one aspherical surface.

28. A wide-angle photographic objective comprising, in sequence from an object-side end to an image-side end:
  a front group of total positive refractive power having at least four lenses;
  a middle group of total positive refractive power having at least three lenses; and
  a rear group of total positive refractive power having at least three lenses, wherein the quotient of the focal length of the front group and the total focal length of the objective amounts to between 2.28 and 2.79, the quotient of the focal length of the middle group and the total focal length of the objective amounts to between 3.02 and 3.69, and the quotient of the focal length of the rear group and the total focal length of the objective amounts to between 3.50 and 4.29, wherein the front group comprises a first subgroup having a positive refractive power and a second subgroup having a positive refractive power, the middle group comprises a third subgroup having a positive refractive power, and the rear group comprises a fourth subgroup having a positive refractive power and a fifth subgroup having a negative refractive power, with each subgroup in each case being formed from a plurality of lenses combined to form a cemented compound lens or from a single lens.

* * * * *